United States Patent [19]

Mirtain et al.

[11] 4,201,260

[45] May 6, 1980

[54] METHOD FOR MAKING A RADIAL PLY TIRE IN A SINGLE BUILDING STAGE

[75] Inventors: Henri J. Mirtain, Compiegne, France; Daniel Shichman, Trumbull, Conn.; James J. Neville, Newfoundland, N.J.

[73] Assignees: Uniroyal, Inc., New York, N.Y.; Uniroyal a Societe Anonyme, Clairoix, France

[21] Appl. No.: 840,863

[22] Filed: Oct. 11, 1977

Related U.S. Application Data

[63] Continuation-in-part of Ser. No. 684,415, May 7, 1976, abandoned.

[51] Int. Cl.² .............................................. B60C 9/22
[52] U.S. Cl. ........................ 152/361 DM; 156/128 N
[58] Field of Search ........... 152/354 R, 357 R, 361 R, 152/361 DM; 156/110 R, 123 R, 124, 128 R, 128 N, 130

[56] References Cited

U.S. PATENT DOCUMENTS

| | | | |
|---|---|---|---|
| 1,779,391 | 10/1930 | Darrow | 156/128 R |
| 2,826,233 | 3/1958 | Cooper | 152/361 R |
| 2,884,044 | 4/1959 | Hulswit et al. | 156/128 |
| 2,982,328 | 5/1961 | Emanueli et al. | 152/361 R |
| 3,195,602 | 7/1965 | Keefe | 152/361 R |
| 3,224,482 | 12/1965 | Barassi et al. | 152/361 R |
| 3,373,066 | 3/1968 | Hindin | 156/128 |
| 3,558,389 | 1/1971 | Bezbatchenko | 156/126 |
| 3,667,529 | 6/1972 | Mirtain | 152/361 R |
| 3,677,319 | 7/1972 | Mirtain | 152/361 R |
| 3,786,851 | 1/1974 | Mirtain et al. | 152/361 DM |
| 3,850,219 | 11/1974 | Snyder | 152/361 DM |
| 3,900,062 | 8/1975 | Neville | 152/361 X |
| 3,918,506 | 11/1975 | Marzocchi | 152/361 R |

*Primary Examiner*—John E. Kittle
*Attorney, Agent, or Firm*—Norbert P. Holler

[57] ABSTRACT

A method of making a belted, radial ply tire in a single stage is disclosed wherein a body layer is formed from one or more body plies of cord fabric which are wound around a tire building drum in such a manner that the cords extend parallel to the axis of the building drum. At least a pair of breaker plies of cord fabric are wrapped around the body plies to create a breaker layer with the cords in each breaker ply being oppositely disposed in adjacent plies, extending parallel to one another within each breaker ply and forming a bias angle of from about 50° to about 70° with a circumferential line corresponding to the crown centerline of the completed tire. A strip of high soft stretch reinforcing tape is wrapped helically over the breaker layer at an angle of substantially 90° to a plane including the axis of the body layer to form a 0° cap band preparatory to securing a tread slab over the breaker layer, completing the raw carcass. The carcass is then expanded into a toroidal form in which the reinforcing tape expands tightly about the breaker layer and the cords in the breaker layer pantograph from their initial larger bias angle to a bias angle of at least about 35° and no more than about 60°. The expanded carcass is then vulcanized. The intermediate article of manufacture formed pursuant to the method is also disclosed.

24 Claims, 7 Drawing Figures

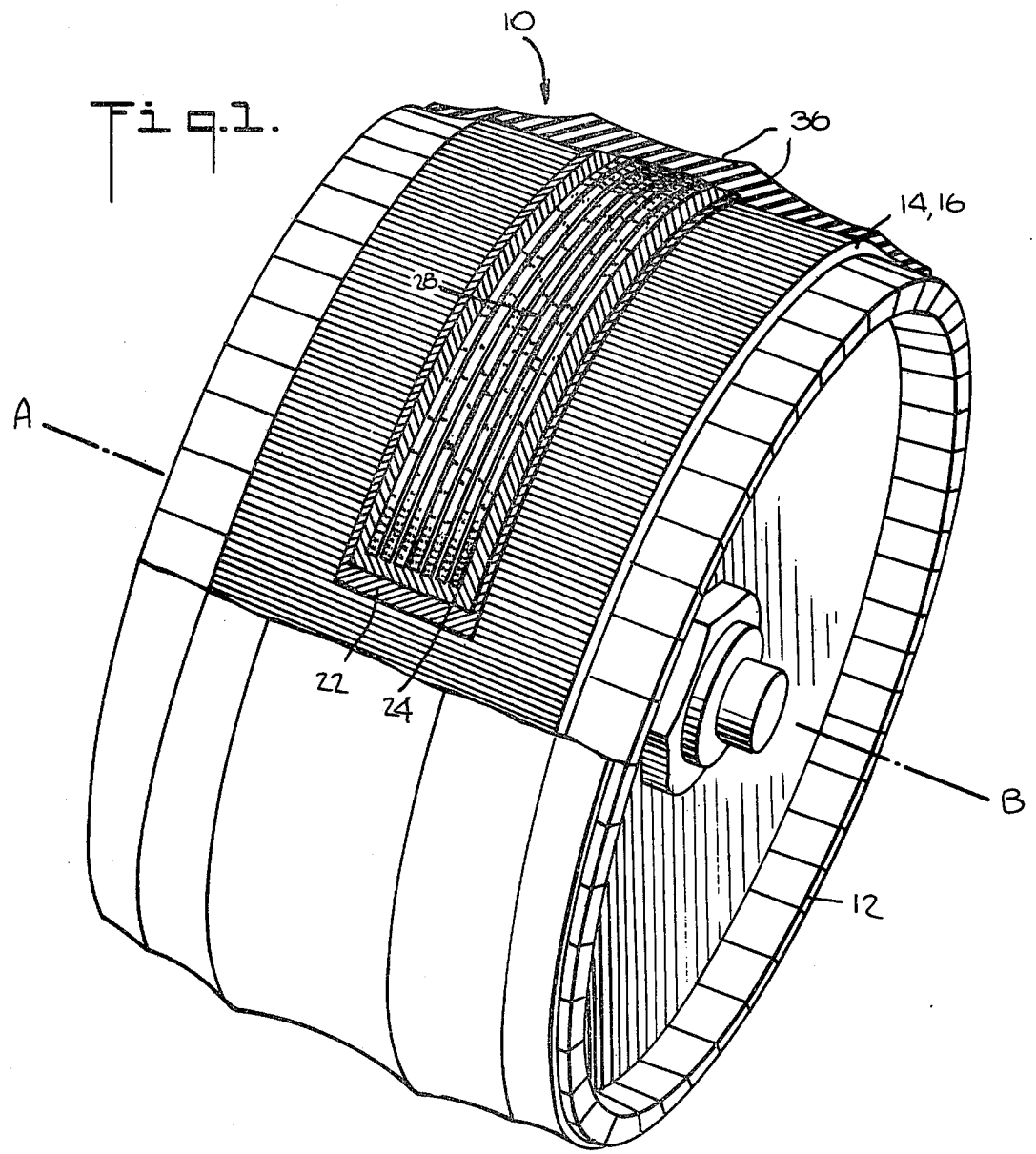
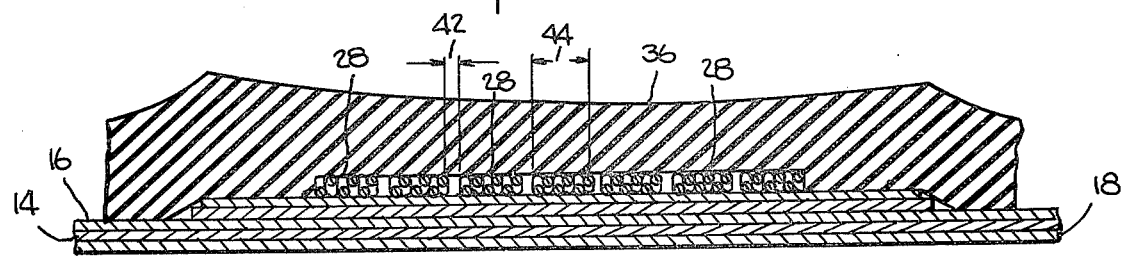

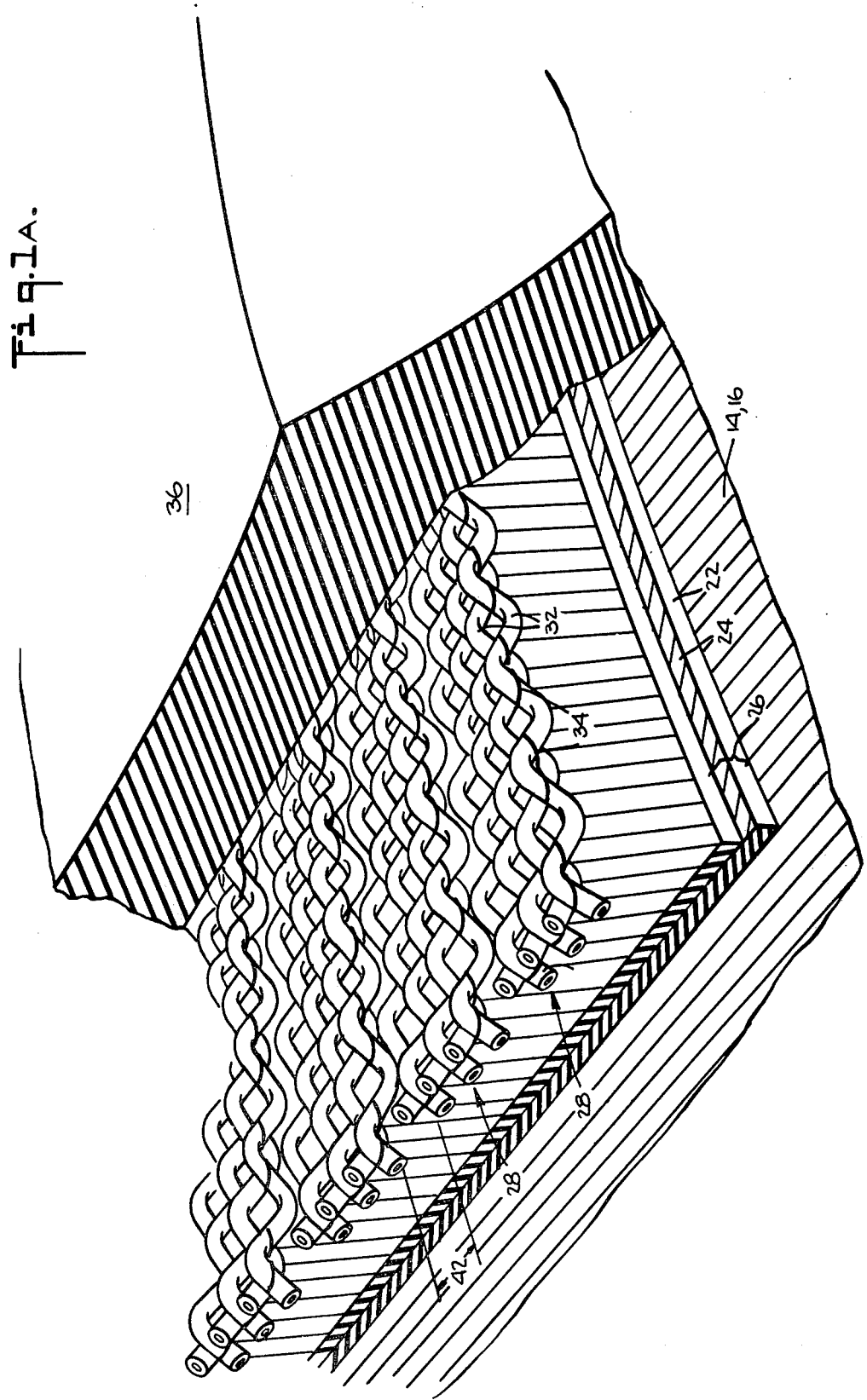

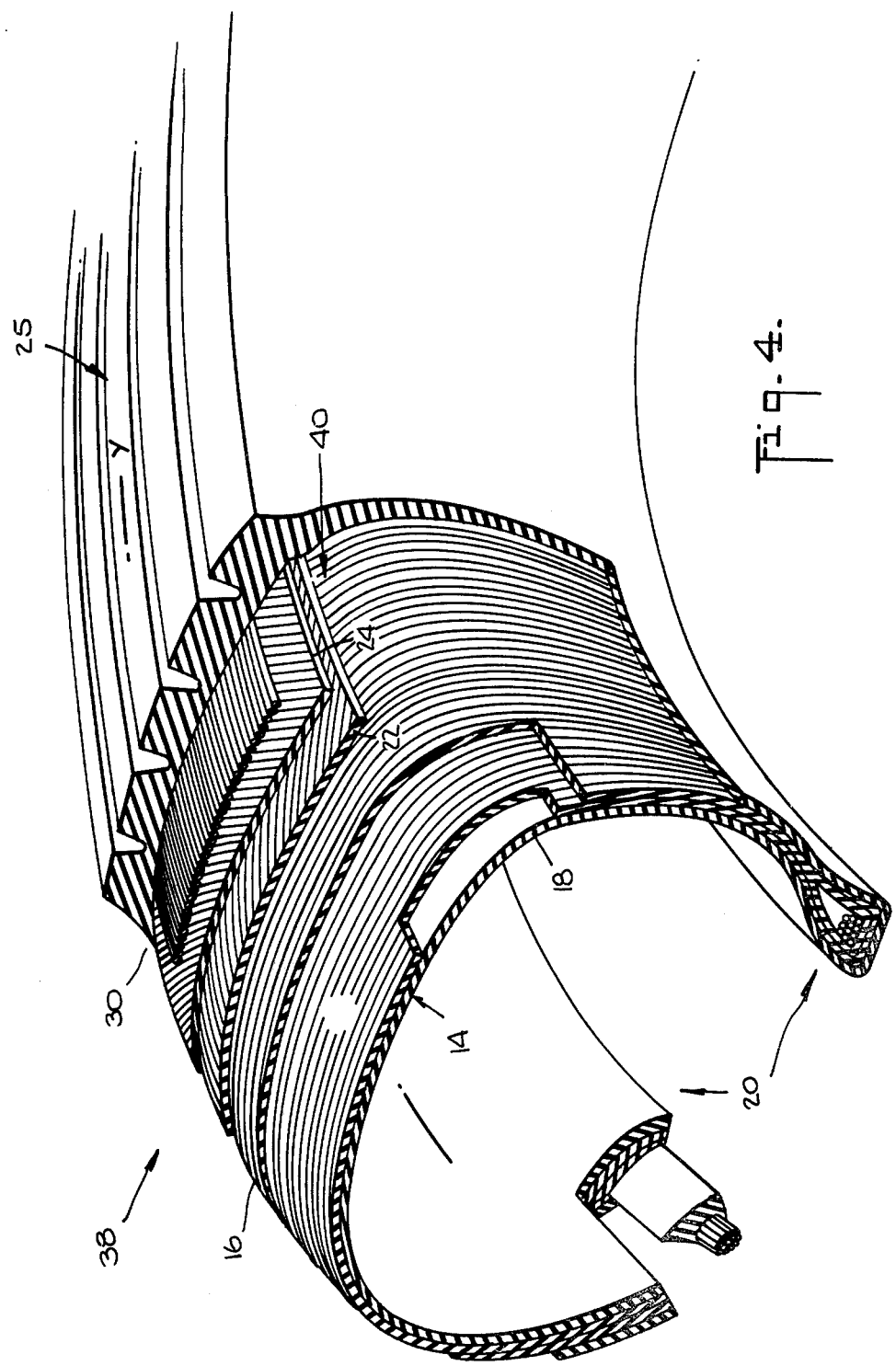

METHOD FOR MAKING A RADIAL PLY TIRE IN A SINGLE BUILDING STAGE

CROSS REFERENCE TO RELATED APPLICATION

This application is a continuation-in-part of U.S. patent application Ser. No. 684,415, filed May 7, 1976, and now abandoned.

BACKGROUND OF THE INVENTION

1. Field of the Invention

This invention relates to a method for making radial ply tires in a single stage and more particularly to a method for making radial ply tires of the type including bias angled breaker plies and a 0° cap band and to the construction of an uncured tire as an intermediate article of manufacture.

2. Prior Art

It has been the goal of the tire industry for many years to improve both safety and the service life of pneumatic vehicle tires, with much attention being focused on such tire characteristics as tread wear, handling and road holding ability, especially during cornering. In this regard the desirability of producing tires with a requisite amount of stiffness has long been recognized.

It should be noted, by way of definition, that in this specification and the appended claims, the term "0° cap band" is used to describe a tire construction in which the cap band cords are oriented either truly circumferentially of the tire or at an angle of substantially 0°, i.e., preferably less than 1° but in any event no more than about 2°, to that direction. The term "low angle" is used to designate belts having a cord angle of up to 25° to the crown centerline while the term "high angle" is used to designate bias belts having a cord angle above about 38° to the crown centerline. The term "rubber" as used herein is intended to denote both natural and synthetic rubbers or rubber-like materials, and blends thereof, specific formulations of which for a wide variety of different tire applications are well known and need not be explicitly set forth herein. The term "substantially inextensible" is used herein to designate the essential characteristics of filamentary reinforcing cords, which may be made of metallic materials such as steel wire or the like or of non-metallic materials such as cotton, rayon, nylon, polyester, polyvinyl alcohol, glass fiber, Aramid or the like, of being able to withstand, without substantial elongation, the tensile stresses in the belt normally encountered in service. The term "radially outer" is used with reference to the surface of the building drum and refers to a vector extending outwardly away from that face. The term "soft stretch" tape is used herein to denote a tape having the ability to be longitudinally considerably extended by the straightening of its component cord or cords without the latter being stretched.

A major step in the direction of improved safety and service life of pneumatic vehicle tires has been the advent of the belted tire, wherein a circumferentially extending belt or belt-like structure is incorporated under the tread in the crown region of the tire carcass so as to introduce a degree of restraint into the deformability of the tread. In such tires, as is well known, the belt is made of one or more plies of generally inextensible reinforcing cords which, in any given ply, are parallel to each other and confined between ply-wide skim coats of rubber and may be oriented at a predetermined angle to the crown centerline or median equatorial plane of the tire. Such plies are generally provided in pairs, with the cords in paired plies being oriented at equal but opposite angles to said plane.

It has been found that the angle which the cords in the breaker belt make with the crown centerline influences the performance characteristics of the tire. Too small an angle will result in low lateral stiffness resulting in poor cornering properties of the tire. Too large an angle will result in low circumferential stiffness and poor tread wear. To remedy the problem of any inherent weakness caused by a large bias angle, resort has been had to positioning a substantially 0° cap band between the breaker belt and the tread to stiffen the tire. The cords in the cap band serve to exert a stability and uniformity enhancing compressive stress on the underlying breaker belt.

Additionally, in belted radial ply carcass tire construction, failure often occurs at high speeds because of separation occurring in the shoulder zones of the tire where the edges of the belt plies are located. Such ply separations are due to the cord ends at the edges of the belt plies becoming detached from the surrounding rubber under the combined effects of centrifugal force acting on the tire, flexing of the tire and heat buildup in the tire. The ply separation is made even more likely by the fact that the cords in the belt plies, being disposed at an angle to the crown centerline of the tire by virtue of said plies being cut at an angle with respect to the longitudinal direction of the cords, have a natural tendency to spread apart at their cut ends. The edges of the belt thus constitute zones where the cut and free ends of the reinforcing elements, i.e., the cords, by friction and by cutting cause breaks both in the carcass plies and in the rubber of the tire.

Cap band structures have been employed also in an attempt to eliminate such separation.

There are certain manufacturing drawbacks and disadvantages which attend the manufacturing of a radial ply tire having a 0° cap band. Principally, this has been due to the fact that, by virtue of the inextensibility of the cords in the cap bands conventionally used, the production of a radial tire having a 0° cap band has generally required a two stage building operation, in which a beltless carcass is built on a relatively low diameter cylindrical drum and is then, either at the carcass building station or at a different station, first shaped into toroidal form on specially constructed radially expansible and axially collapsible drum before the belt and tread are applied. A representative illustration of the prior art 0° cap band radial tire technology is set forth in U.S. Pat. No. 3,850,219. The manufacture of the belted tire disclosed therein requires the building of the carcass in a substantially flat or cylindrical form. The carcass is then shaped to its toroidal form, whereupon belt plies, the cap band in an unstressed condition, and the overlying tread rubber, which were combined in a separate stage, are then applied to the crown region of the shaped carcass to complete the raw tire. Such two stage tire building installations are both complex and expensive.

It is also known to manufacture radial tires in a single stage. A representative illustration of this technology is set forth in U.S. Pat. No. 3,558,389. In the method disclosed therein the belt cords are arranged in corrugated cord fabric plies which are bias cut, and these are so applied to the carcass that the belt cords are oriented at relatively high angles, i.e., between 40° and 60° to the crown centerline during the building operation and then, during the shaping of the tires in the press, pantograph down to some lower angles, i.e., less than 20° to the crown centerline. Such a method requires a special design for the breaker belt and does not make provision for including a cap band in the tire. In U.S. Pat. No. 3,373,066 there is disclosed a method for making a radial ply tire in a single stage which contains breaker plies having cords lying at angles of between 25° to 35°. When the tire is expanded into its toroidal form, the cords pantograph by the aid of lubrication which is applied to the breaker plies. The problem with applying lubrication during the tire building operation is that it can affect adhesion properties and excess lubricant tends to cause surface blemishes.

It is possible to manufacture radial ply tires in a single stage process without a specially designed breaker belt or the use of lubrication; however, the cords in the breaker belt in the tire usually lie at a relatively high angle with respect to the crown centerline. It requires a significant tension force to displace the cords in the belt to a low angle in the absence of specially designed breaker belts or lubrication and a tension force of the magnitude required cannot be applied successfully in ordinary manufacturing operations. It has been found also that as one attempts to displace the cords to lower angles, tire uniformity problems are encountered as the cords have a tendency to move in a less uniform manner. It should be noted that the tire uniformity problem also exists when the cords lie initially, at a low angle and are pantographed to a still lower angle during shaping.

A tire having a breaker belt of cords oriented at a high bias angle has a low hoop modulus and a relatively low stiffness. Theoretically, the problem of a relatively low hoop modulus of the tire having high bias angled breaker ply cords can be dealt with by providing a substantially 0° cap band.

It should be noted that while there is some expansion of the cap band during the second stage process this expansion is minimal when compared to the expansion which must be undertaken by the cords in the cap band in a single stage process. Since the cords comprising the cap band are already substantially at 0° relative to the crown centerline of the tire carcass, there can be no slippage or movement toward a circumferential orientation as occurs with the cords in the breaker plies, and, because the cords of the cap band are generally inextensible, they cannot stretch to the degree necessary in a single stage process to accommodate the expansion of the carcass.

It is towards elimination of these and other problems that the present invention is directed.

SUMMARY OF THE INVENTION

1. Purpose of the Invention

It is an object of the present invention to provide a novel and improved method for making a radial ply tire having a 0° cap band in a single building stage.

It is a further object of the present invention to provide a novel and improved method for making such a tire on conventional single stage building equipment.

It is another object of the present invention to provide, through the implementation of said method and as an intermediate article of manufacture, an uncured, radial ply tire having a 0° cap band structure.

2. Brief Description of the Invention

Generally speaking the method for making a radial ply tire in a single stage in accordance with the present invention includes the steps of (a) winding at least one body ply of tire cord fabric around a tire building drum to form a cylindrically shaped body layer, the cords in the body ply extending substantially parallel to the axis of the drum; (b) serially wrapping an even multiplicity of breaker plies of bias coated angled cord fabric around the radially outer surface of the body layer to form a breaker layer, the cords in the breaker plies being parallel in each ply and oppositely disposed in adjacent plies and forming an angle of between about 50° and 70° with respect to a circumferential line on the unformed carcass corresponding to the crown centerline of the completed tire; (c) helically winding a strip of high "soft-stretch" reinforcing cord tape for at least a selected plurality of full turns circumferentially about the radially outer surface of the breaker layer at an angle of substantially 90° to a plane including the axis of the body layer which corresponds to the axis of the building drum to form a cap band structure having a desired axial width; (d) wrapping a tread slab around the radially outer surface of the cap band so as to provide a raw, cylindrically shaped, tire carcass having a diameter which is substantially less than the diameter of the crown region of the corresponding cured, toroidally shaped, completed tire; (e) expanding circumferentially the tire carcass such that (i) the cap band expands tightly about the breaker layer with the cords in the cap band being straightened out and tautened about the breaker layer, and (ii) the cords in the breaker layer are displaced to an angle of between at least about 35° and about 60° relative to the circumferential line corresponding to the crown centerline of the completed tire; and (f) vulcanizing the expanded carcass.

An intermediate article of manufacture of the present invention is an uncured radial ply tire having a 0° cap band in the as drum-built form thereof. The tire includes a cylindrically shaped body layer including at least one body ply of tire cord fabric in which the cords extend substantially parallel to the axis of the cylindrically shaped layer. A breaker layer is positioned circumferentially about the body layer and includes an even multiplicity of plies of bias angled cord fabric in which the cords are parallel in each ply and oppositely disposed in adjacent plies and form an angle of between about 50° and about 70° with a circumferential line corresponding to the crown centerline of the completed tire. A cap band structure which is positioned circumferentially about the breaker layer is formed by helically winding a strip of high "soft-stretch" reinforced cord tape circumferentially about the radially outer surface of the breaker layer at an angle of substantially 90° to a plane including the axis of the body layer for at least a selected plurality of full turns. The reinforcing cord tape is longitudinally extensible by between about 30% and about 75% without stretching the cords thereof. A tread slab is positioned circumferentially about the cap band to complete the raw carcass.

BRIEF DESCRIPTION OF THE DRAWINGS

While the specification concludes with claims particularly pointing out and distinctly claiming the subject matter regarded as the invention herein, it is believed that the invention will be better understood from the following description when read in conjunction with the accompanying drawings, in which:

FIG. 1 is a partially sectioned perspective view of a raw, cylindrically shaped tire carcass, in its as-built form, on a building drum, made in accordance with the method of the present invention;

FIG. 1A is an enlarged, partially sectioned, perspective view of a portion of the carcass illustrated in FIG. 1;

FIG. 2 is an axial sectional view of the intermediate article tire carcass of the present invention illustrated in FIG. 1;

FIG. 4 is a partially sectioned perspective view of a cured, toroidally shaped, completed tire made according to the method of the present invention.

DESCRIPTION OF THE PREFERRED EMBODIMENTS

Figure 2A:
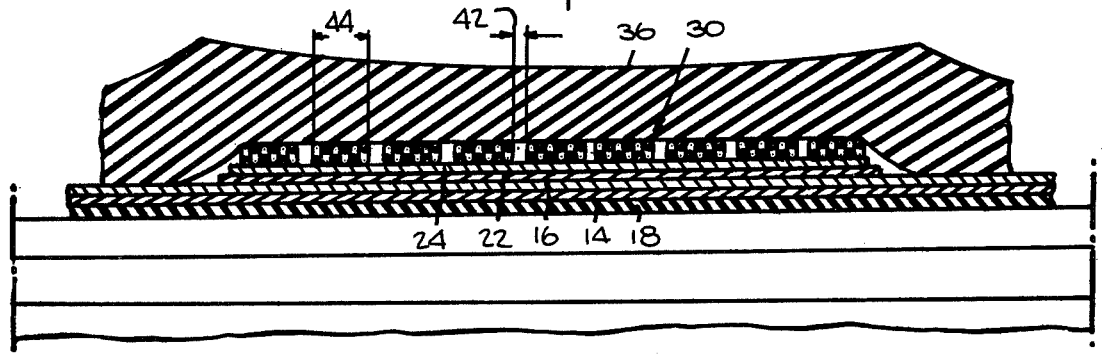
FIGS. 2A and 2B are views similar to FIG. 2 and illustrate modifications of the tire carcass shown in FIG. 2.

Referring now to the drawings there is shown in FIG. 1 a raw cylindrical tire carcass 10 in its as built form on a low diameter building drum 12. The term "low diameter" is here used with respect to the tire building drum to signify that the diameter of the drum, and consequently the diameter of the generally cylindrical carcass built thereon, is appreciably smaller than the final diameter to which the carcass will be radially expanded when being shaped into its desired toroidal form as an adjunct of the curing operation in the mold. The tire building drum 12 is of the type conventionally used in the tire building art for first stage tire building. It may be of the expandable and contractible type and may be either a flat drum or a shoulder drum.

The method for making a radial ply tire in a single stage is, in the initial stages of the building operation, conventional. The first step is to wind at least one body ply, and preferably two body plies, 14 and 16, of tire cord fabric in which the cords extend substantially parallel to the axis, indicated at A-B, of the drum 12, around the drum over a rubber liner 18 (FIG. 2) which has been wrapped previously thereon, to form a cylindrically shaped body layer. The associated carcass components such as the bead cords, chafer and apex strips, etc., indicated generally at 20 (FIG. 4), are also assembled on the building drum in a conventional manner. Next, an even multiplicity of breaker plies 22 and 24 of bias angled tire cord fabric are serially wrapped around the radially outer surface of the body layer to form a breaker layer 26. The breaker tire cords which may be of steel and which are substantially inextensible, are oriented parallel to one another in each ply and are oppositely disposed in adjacent plies, and the angle they form relative to the circumferential line as the unformed carcass corresponding to the crown centerline of the completed tire is between about 50° and about 70°.

The next step is to wind helically a strip of high "soft stretch" reinforcing cord tape or tape 28 around the radially outer surface of the breaker layer for at least a selected plurality of full turns to form a cap band 30 having a desired axial width. The tape 28, which is longitudinally extensible by between about 30% and about 75% without the stretching of the cords thereof, is wound at an angle of substantially 90° relative to the plane including the axis of the body layer and consequently the axis of the building drum.

Figure 3:
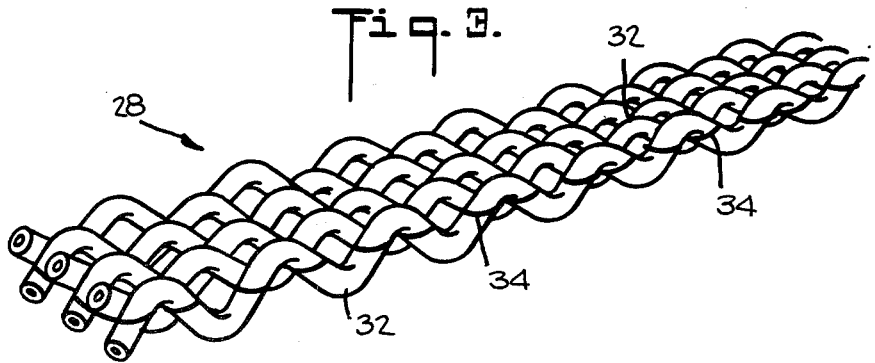
FIG. 3 is a fragmentary, diagrammatic, perspective view of a six-cord high "soft-stretch" tape used in the manufacture of the tire carcass illustrated in FIG. 1 according to the method of the present invention.

The tape 28 which is used to create the cap band 30 is of the type disclosed in U.S. Pat. No. 3,774,662, and a fragmentary diagrammatic, perspective view thereof is illustrated in FIG. 3. Of course, any tape possessing the required characteristics would be satisfactory for use. Generally speaking, such a tape would include a continuous, longitudinally extensible strand of one or more substantially inextensible cords 32 each having formed therein a multiplicity of undulations which in any given straight length of the tape are substantially planar, the undulations preferably being of a generally sinusoidal nature. The tape 28 includes the required number of individual cords 32, each of which may be untreated or may have a coating of rubber or latex or other rubber-adhesion promoting material applied thereto and is made so that the final tape has the desired stretch ratio, i.e., the ratio of straightened cord length to unextended tape length. A relatively weak and frangible cotton or like yarn or thread 34 holds each of the cords of the tape in its undulating state and, where the tape 28 includes a plurality of cords 32, more than one of these cords may also be tied to each other by the stitches 34. In a preferred version of such a plural-cord tape used to form the cap band 30, the cords 32 are disposed side by side with the undulations of laterally adjacent cords in parallel planes and out of phase with one another. To enhance the stability and integrity of the tape 28 a second relatively weak and frangible cotton or like thread or yarn (not shown) may also be woven into and held by the aforementioned stitches. The second yarn, which extends the length of tape is, however, in almost a straight condition, with only minimal undulation. Also each of the cords 32 may be provided with a multiplicity of longitudinally spaced locally weakened portions to enhance its ability to be stretched and elongated somewhat after being fully straightened. The weakening of the cord portions, which may be effected mechanically, chemically or otherwise is accomplished in such a manner as to leave the portions with a relatively low residual tensile strength, generally on the order of about 5% to 20% of their pre-weakened or full tensile strength. For the production of any given tire, the weakening interval, i.e., the cord length between successive weakened portions is selected and present to be different from, but not equal to a regular fractional multiple of, the ultimately intended circumferential length of a full turn of the cap band 30 in the finished tire.

The tape winding operation may be either unidirectional or bidirectional with reference to the axis of the building drum and the winding is continued until the tape-constituted cap band structure extends over the desired width of the medial region of the cylindrical carcass. The tape 28, once properly laid on the breaker layer 16, will not twist or shift out of its wound-on position, and the use of a tape of plural-cord width will enable a relatively large number of cords to be applied with each turn of the tape.

It should be noted, merely by way of example, that it has been found that for most standard rim size 0° cap banded passenger tires which are completely built in a flat band form in a single stage building operation prior to being shaped, a tape having a stretch ratio of between about 1.5 and 1.9 (50% and 90%) provides satisfactory results. It will also be understood, however, that for certain types of tires the building operation may dictate the use of a tape having a stretch ratio which may be as low as bout 1.2 (20%), while for other types of tires the stretch ratio may have to be as much as 4 (400%).

Preferably prior to winding the tape 28 helically around the breaker layer 26, the breaker layer is stitched (adhered) in its axially central portion to the body layer. It has been found advantageous to stitch the breaker layer in the area of one inch (1") on each side of the axial centerline thereof so as to prevent shifting of the breaker layer 26 during the shaping of the cylindrical carcass into the toroidal tire at which time the tire cords in the breaker layer are displaced as discussed more fully hereinbelow.

The raw or green, cylindrically shaped tire carcass is completed by wrapping a tread slab 36 around the radially outer surface of the cap band 30 and the tread splices are stitched (adhered) to insure that no undesired bunching of the cap band turns will occur. The raw, cylindrically shaped, tire carcass 10 will have a diameter which is substantially less than the diameter of the crown region of the corresponding cured, toroidally shaped, completed tire 38 which is shown partially sectioned in FIG. 4. Thereupon, the raw cylindrically shaped tire carcass is removed from the building drum and is ready to be subjected to the final shaping and curing operation.

The final step in the method for making the radial ply tire is the step of simultaneously shaping and curing the raw, cylindrically shaped, carcass 10 to form the completed tire 38. It will be understood that although the steps of shaping and curing are indicated herein as occurring simultaneously, in actuality the shaping step begins as the curing mold is closed onto the cylindrically shaped carcass 10 whereas the curing step does not commence until after the shaping of the tire has commenced. Nevertheless these two steps, which both occur in the curing mold are so closely related in time that, for the purposes of this invention, they may be considered to occur simultaneously or one as a concomitant of the other. It will be understood, however, that the steps of shaping and curing need not occur essentially simultaneously and that the tire may be substantially completely shaped (except for any small residual shaping that may ultimately take place in the mold) in a separate step, essentially fully performed prior to the start of the vulcanizing or curing operation, by using shaping means known in the art.

When a raw tire carcass built by the above described method is radially expanded and axially contracted into its final toroidal shape (either in the curing press or prior to its being put thereinto), the cap band forming structure defined by the wound on tape is, of course, subject to the same type of radial expansion. This expansion almost immediately causes the weak stabilizing or stitching threads or yarn 34 to be broken and they then have no further function in either the process or the tire, although of course they remain in the tire. As the expansion of the tire continues, the cords 32 lose their undulations and are ultimately completely straightened out to define the cap band.

In this connection it should be noted that whether the tire is to be cured in a segmented mold, in which case the cap band expansion will be substantially completed before the mold is closed, or whether the tire is to be cured in a standard unsegmented "clam-shell" mold, in which case a small further expansion will take place after the mold is closed, the tape used may have a "soft stretch" or stretch ratio as nearly as possible exactly equal to that actually required for the full radial expansion. Preferably, however, the tape 28 used will normally have a stretch ratio somewhat less than the full expansion ratio, on the order of between about 1% and about 3% less, so that the cords 32 become fully straightened therefrom shortly before the shaping operation is completed. In such a case during the final expansion of the tire, i.e., upon the forcing of the tire against the mold surfaces under high internal pressure after the mold is closed, the cords in the forming structure cap band will be subjected to fairly high tensile stresses and elongate to the extent required. Where the cords, by virtue of the construction and the stress-strain characteristics of the cord material, can accommodate the resultant strain and elongation without exceeding their elastic limit, the fact that they may be unweakened will not lead to any problems. Where, on the other hand, the cords are locally weakened, they will additionally have an increased ability to undergo a "hard stretch" without adverse effect, i.e., they will be able to elongate either by the strain of the cord material or by actually breaking at one or more of the locations of the various weakened portions thereof, or by a combination of these and similar characteristics. The weakening of the cords of the tape 28 at a multiplicity of longitudinally spaced points as described thus can be seen to provide a margin of safety, due to the presence of which a possible choice of a tape stretch ratio somewhat lower than ordinary relative to the tire expansion ratio can be compensated for and thus tolerated.

By helically winding the longitudinally extensible tape 28, the final cap band 30 is devoid of splices which leads to a greater degree of uniformity and dynamic balance in the finished tire. Another advantage of the 0° cap band is that of a maximized hoop modulus of the tire in the circumferential direction relative to the hoop modulus which a tire utilizing only biased belts directly under the tread would have.

Although a cap band 30 having an axial width less than that of the underlying breaker layer 26 may be utilized, it is known as noted above that radial ply carcass tires in which the tread is, as herein, reinforced by a breaker layer 26 composed of superposed, mutually crossed, rubberized plies of parallel substantially inextensible cords, often fail at high speeds because separations occur in the shoulder zones 40 (FIG. 4) of the tires where the edges of the breaker plies 22 and 24 are located.

Where the tires constructed pursuant to the method and embodying the intermediate article disclosed herein are to be utilized in high speed service, it is advantageous to design the cap band 30 so that its axial width is at least as great as, and preferably greather than, the width of the breaker layer 26. Such a construction will enable the 0° cap band to minimize the detrimental ply edge separation.

Reinforcing tapes of the type herein described and utilized are not made conveniently with more than about 4 or 5 cords 32 therein. When it is desired to utilize in the building of the cap band 30 of the instant invention a tape 28 having a relatively high number of component cords 32, such a tape may be made of a plurality of tapes of lesser cord numbers, with these lesser cord tapes being cemented or otherwise secured to one another in a side by side relation. It is appropriate to note that if such a side by side relation of low number cord tapes is utilized, it is advantageous to offset the low number cord tapes relative to one another so as to cause the undulations of the respective adjoining side cords to be out of phase.

As shown in FIG. 2 the tape 28 forming the cap band 30 is wound preferably with the turns of the band forming structure spaced slightly from each other by a gap 42 of predetermined width, the reason for which will be discussed below.

It will be understood that in order to achieve the stated orientation of the tape turns, i.e., in a direction as nearly perpendicular to the plane including the axis of the body layer, i.e., the unformed carcass as feasible, and thus as close to the truly circumferential direction as possible, it is necessary to insure that the helix or winding angle of the tape be as small as possible. For the purpose of the instant invention this means the helix angle may not be greater than about 2° and is preferably less than 1°. The magnitude of the helix angle will basically be a function of, on the one hand, the width of the reinforcing cord tape indicated at 44, plus the width of the gap 42 between two adjacent turns of the tape, and of, on the other hand, the diameter of the drum 12, these parameters defining, respectively, the lead of the helix and the length of one turn of the tape around the circumference of the drum. By way of example, a tire built on a 15 inch diameter drum and including a cap band forming structure utilizing a rubber coated rayon cord six cord wide tape the width of which is approximately 0.3 inch wound "on end" with a gap of approximately 0.1 inch, will have a winding angle of approximately $\frac{1}{2}°$, this angle being the tangent of the quotient of the lead of the helix divided by the circumference of the drum, i.e., approximately 0.0085.

As noted above, during the shaping operation the cords in the reinforcing cord tape straighten and the cap band forming structure becomes somewhat narrower. It will be apparent, therefore, that it is to facilitate this narrowing and at the same time prevent the cords from bunching up at indeterminate locations across the width of the cap band that the winding gap between the turns of the tape in the cap band forming structure is provided. The width of the gap is predetermined and selected to yield the desired cord density in the final band without unduly increasing the helix or winding angle. Nevertheless, it should be understood that the gap may be either entirely omitted or not specifically controlled so as to be ununiform throughout if some bunching of the cords and the resultant non-uniformity of the cap band 30 can be tolerated. Further, it should be understood that gaps as large as three-quarters of one inch, and even slightly larger, depending on tire size and tape width, may be utilized. By way of example, a tire as small as one built on a 13 inch diameter drum and including a tape as wide as a nine cord wide tape the width of which is approximately 0.45 inch, would have a winding angle, if a three-quarter inch gap were utilized, of 1.7°.

In order to minimize any possible discontinuity in the rubber to cord stress transfer in the ultimate finished tire it is deemed advisable to effectively skive the tape at the opposite lateral edges of the cap band forming structure. This may be accomplished by peeling away and cutting off at each end of the tape a predetermined length of the end region of the laterally outwardly facing tape component.

Although only a mono-ply cap band has been illustrated, a multi-ply 0° cap band may be provided. This may be accomplished, by, after a cap band of a desired axial width is created by means of the above described helical winding of the tape 28, continuing to wind the tape back onto itself at the same helix angle. An alternative method is to sever the tape 28 after a cap band having a desired axial width is generated and to begin the winding process again with a second cap band ply which is wound on the radially outer surface of the first cap band ply. Still another method of providing a multi-ply cap band is to utilize a multi-ply or "nested" tape (not shown), i.e., a tape in which a multiplicity of cords are arranged so that the undulations of each cord are interfitted with, and lie in the same plane as, the undulations of each adjacent cord, and to helically wind this multi-ply tape a single time. The cap band which results from this last method will have a number of plies equal to the number of layers of the nested tapes.

With reference to FIG. 1A there is illustrated an enlarged partial view of the completed raw carcass illustrated in FIG. 1. In this view, more clearly than in FIG. 1, it may be seen that the tape 28 includes six adjacent cords 32, the tape as noted above, being composed of two three-cord high or wide tapes. The gap 42 between each wrapping of the tape 28 may be more clearly seen in this view as may be the stitching yarns 34 which, as previously noted, serve to maintain the cords 32 in position relative to one another until the tire is shaped.

Turning now to FIG. 2 there is shown an axial sectional view of the intermediate article tire carcass of the present invention. This carcass is, of course, the carcass 10 illustrated in FIG. 1 after the removal thereof from the building drum 12. It will be noted that in FIG. 2, as was discussed with regard to FIG. 1A, the cap band 30 of the instant invention is made up of a plurality of helical windings of undulating reinforcing cord tapes 28.

Figure 2B:
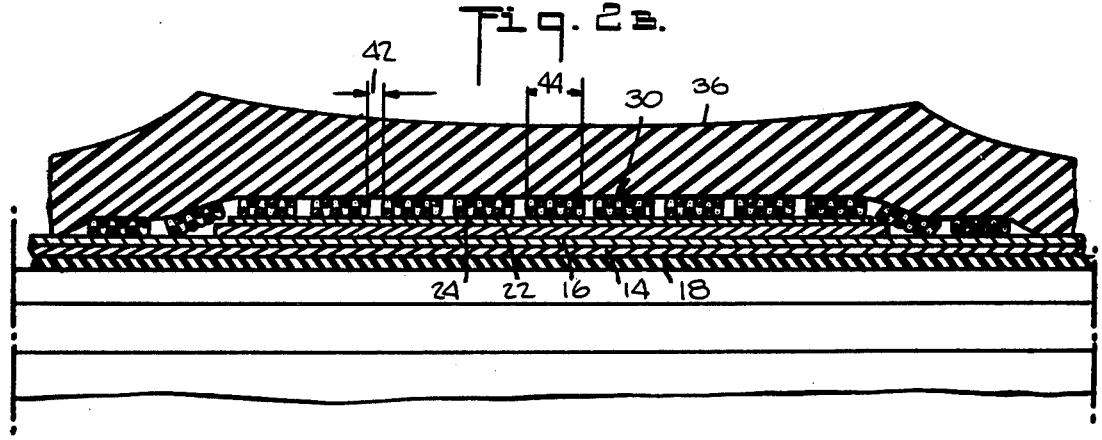

Turning now to FIGS. 2A and 2B, it can be seen that modifications of the tire carcass illustrated in FIGS. 1, 1A and 2 are shown. FIG. 2A illustrates a cap band 30 having an axial width equal to the axial width of the widest of the breaker plies 22 and 24 comprising the breaker layer 26. In this regard, although each of the FIGS. 2A and 2B illustrates a breaker layer comprised of breaker plies which are of progressively narrower axial width in the radially outward direction, i.e., the axial width of breaker ply 24 is less than that of breaker ply 22, the tire may also be constructed with breaker plies each having the same axial width as well as with breaker plies which are progressively axially wider in the radially outward direction. FIG. 2B illustrates an embodiment of the invention in which the cap band 30 has an axial width greater than the axial width of the axially widest breaker ply of the breaker layer 26. This structure may advantageously be utilized in tires intended for use at high speeds for the reasons discussed previously.

With reference to FIG. 4 there is shown a partially sectioned perspective view of the cured, toroidally shaped, complete tire 38 made according to the method of the present invention. The diameter of the toroidally shaped completed tire, in the crown region thereof, is approximately 1.59 times as great as the diameter of the cylindrically shaped tire carcass 10 illustrated in FIG. 1. In general, however, the diameter of a completed tire, in the crown region thereof, will be between about 35% and about 75% greater than the diameter of the corresponding raw tire carcass.

As noted hereinabove, during the expansion of the raw cylindrical tire carcass into the toroidal shape, the cords in the breaker plies are displaced with respect to each other, i.e., they pantograph to a lower bias angle than that at which the cords were oriented originally in the breaker plies during the building operation.

In general, the cords in the breaker plies will be displaced during the shaping from between an angle of about 50° and about 70° with the circumferential line corresponding to the crown centerline of the completed tire to an angle of between at least about 35° and no more than about 60° with the crown centerline or median equatorial plane of the tire (indicated at X-Y in FIG. 4). It has been found that from a tire uniformity standpoint, the cords preferably should pantograph to an angle of between 40° and 45° from a starting angle of about 62°.

It can be seen from the foregoing detailed description that the objects of the present invention namely to produce a radial ply tire having a 0° cap band in a single stage operation has been achieved by winding at least one ply of tire cord fabric around a tire building drum to form a cylindrically shaped body layer. The cords in the body layer are oriented substantially parallel to the axis of the building drum. Next a multiplicity of breaker plies of bias angled cord fabric are wrapped about the body layer, the cords in the breaker plies being parallel in each ply and oppositely disposed in adjacent plies and forming a bias angle of between about 50° and about 70° with a circumferential line corresponding to the centerline of the body layer. A strip of high "soft stretch" reinforcing cord tape is then wound helically around the radially outer surface of the breaker layer at an angle of substantially 90° relative to the axis of the body layer to form a cap band of a desired width. The cords in the reinforcing cord tape are longitudinally extensible by between 30% and about 75% without stretching. A tread slab is then wrapped around the body layer to form the completed raw tire carcass.

The raw tire carcass is then circumferentially expanded preparatory to vulcanization thereof such that the cap band expands so as to be tight about the bias breaker layer and the cords in the breaker plies pantograph to a bias angle of between at least about 35° and not more than about 60° relative to the crown centerline of the tire.

While in accordance with the patent statutes preferred embodiments of the present invention have been illustrated and described in detail, it is to be particularly understood that the invention is not limited thereto or thereby.

What is claimed is:

1. A method for making a radial tire in a single stage, comprising the steps of:
   (a) winding at least one ply of tire cord fabric around a tire building drum to form a cylindrically shaped body layer, all of the cords in said body layer extending substantially parallel to the axis of said building drum;
   (b) wrapping serially a multiplicity of breaker plies of bias angled cord fabric around the radially outer surface of said body layer to form a breaker layer, the cords in said breaker plies being parallel in each ply and oppositely disposed in adjacent plies and forming a starting bias angle of between about 50° and about 70° with a plane corresponding to the mid-circumferential centerline of said body layer;
   (c) winding helically a strip of high "soft stretch" reinforcing cord tape around the radially outer surface of said breaker layer for at least a selected plurality of full turns to form a cap band having a desired axial width, said reinforcing cord tape being longitudinally extensible by between 30% and about 75% without stretching the cords thereof, said reinforcing cord tape strip being wound at an angle of substantially 90° relative to the axis of said body layer;
   (d) wrapping a tread slab around the radially outer surface of said cap band so as to provide a raw, cylindrically shaped, tire carcass having a diameter which is substantially less than the diameter of the crown region of a correspondingly cured, toroidally shaped, completed tire; and
   (e) radially expanding and axially contracting said tire carcass as an adjunct to the vulcanization thereof to transform said tire carcass from its cylindrical shape to a toroidal shape such that (i) said cords in said breaker plies pantograph to a final bias angle relative to the crown centerline of the shaped tire determined by the starting bias angle and the degree of expansion of said tire carcass, and (ii) the reinforcing cord component of said reinforcing cord tape strip becomes fully straightened and tautened and the resultant circumferentially and radially expanded cap band tightly embraces said breaker layer with said reinforcing cord component of the former extending at a substantially 0° bias angle relative to the crown centerline of the shaped tire carcass.

2. A method for making a radial ply tire according to claim 1, wherein the shaping of said raw tire carcass from its cylindrical shape to its toroidal shape is effected as a concomitant of the vulcanization of said tire carcass.

3. A method for making a radial ply tire according to claim 1, wherein the shaping of said raw tire carcass from its cylindrical shape to its toroidal shape is effected prior to the vulcanization of said tire carcass.

4. A method for making a radial ply tire according to claim 1, wherein the axial width of said cap band is less than the axial width of said breaker layer.

5. A method for making a radial ply tire according to claim 1, wherein the axial width of said cap band is equal to the axial width of said breaker layer.

6. A method for making a radial ply tire according to claim 1, wherein the axial width of said cap band is greater than the axial width of said breaker layer.

7. A method for making a radial ply tire according to claim 1, wherein said strip of reinforcing cord tape comprises a plurality of substantially inextensible cords disposed in side by side relation to one another.

8. A method for making a radial ply tire according to claim 7, wherein said strip of reinforcing cord tape comprises six substantially inextensible cords disposed in side by side relation to one another.

9. A method for making a radial ply tire according to claim 1, wherein said reinforcing cord tape is so wound around said breaker layer as to provide an axially extending gap of between about zero and about three-quarters of one inch between adjacent turns of said tape.

10. A method for making a radial ply tire according to claim 1, wherein said cords in said breaker plies are steel.

11. As an intermediate article of manufacture, an uncured, radial ply carcass having a 0° cap band in the drum-built form thereof, comprising:
   (a) a bead-anchored cylindrically shaped body layer including at least one body ply of cord fabric, with all of the cords in said body layer extending substantially parallel to the axis of said body layer;
   (b) a breaker layer positioned circumferentially about said body layer in the medial region of the latter, said breaker layer including a multiplicity of breaker plies of bias angled cord fabric, the cords of said breaker layer being parallel in each ply and oppositely disposed in adjacent plies and forming an angle of between about 50° and about 70° with a plane corresponding to the mid-circumferential centerline of said body layer;
   (c) a cap band positioned circumferentially about said breaker layer, said cap band being constituted by a helically wound strip of high "soft stretch" reinforcing cord tape extending around the radially outer surface of said breaker layer for at least a selected plurality of full turns, said reinforcing cord tape being longitudinally extensible by between about 30% and about 75% without stretching the cords thereof, and said reinforcing cord tape strip being wound at an angle of substantially 90° relative to the axis of said body layer so that upon ultimate radial expansion and axial contraction of the raw tire carcass the reinforcing cord component of said cap band will extend at a substantially 0° bias angle relative to the crown centerline of the toroidally shaped tire carcass and will be straightened and tightly embrace said breaker layer; and
   (d) a tread slab positioned circumferentially about said cap band.

12. An intermediate article of manufacture according to claim 11, wherein said cords in said breaker plies are steel.

13. An intermediate article of manufacture according to claim 11, wherein the axial width of said cap band is less than the axial width of said breaker layer.

14. An intermediate article of manufacture according to claim 11, wherein the axial width of said cap band is equal to the axial width of said breaker layer.

15. An intermediate article of manufacture according to claim 11, wherein the axial width of said cap band is greater than the axial width of said breaker layer.

16. An intermediate article of manufacture according to claim 11, wherein said strip of reinforcing cord tape comprises a plurality of substantially inextensible cords disposed in side by side relation to one another.

17. An intermediate article of manufacture according to claim 16, wherein said strip of reinforcing cord tape comprises six substantially inextensible cords disposed in side by side relation to one another.

18. An intermediate article to manufacture according to claim 11, wherein said reinforcing cord tape is disposed to provide between each two adjacent turns of said tape an axially extending gap between about zero and about three-quarters of one inch wide.

19. A single stage built radial ply tire having sidewalls, beads and a tread, said tire comprising:
   (a) a bead-anchored toroidally shaped carcass composed of a body layer including at least one body ply of cord fabric defining sidewall regions and a crown region, with all of the cords in said body layer extending from bead to bead and in substantially radial planes relative to said beads and the axis of said body layer;
   (b) a breaker layer positioned circumferentially about said body layer in said crown region of the latter, said breaker layer including a multiplicity of breaker plies of bias angled cord fabric, the cords of said breaker layer being parallel in each ply and oppositely disposed in adjacent plies and forming in each ply a bias angle of between at least about 35° and not more than about 60° with the mid-circumferential plane of said carcass; and
   (c) a cap band positioned circumferentially about said breaker layer intermediate the same and the tread, said cap band being constituted by a small number of reinforcing cords extending in helical screw thread fashion around the radially outer surface of said breaker layer for at least a selected plurality of full turns, with said reinforcing cords of said cap band being oriented at a substantially 0° bias angle relative to said mid-circumferential plane of said carcass and tightly embracing said breaker layer.

20. A tire according to claim 19, wherein said cords in said breaker plies are steel.

21. A tire according to claim 19, wherein the axial width of said cap band is less than the axial width of said breaker layer.

22. A tire according to claim 19, wherein the axial width of said cap band is equal to the axial width of said breaker layer.

23. A tire according to claim 19, wherein the axial width of said cap band is greater than the axial width of said breaker layer.

24. A tire according to claim 19, wherein said cords in each ply of said breaker layer are oriented at a bias angle of between 40° and 45° to said mid-circumferential plane.

* * * * *